United States Patent
Biskeborn et al.

(10) Patent No.: US 9,355,656 B1
(45) Date of Patent: May 31, 2016

(54) DUAL PURPOSE TAPE WRITE TRANSDUCER

(71) Applicant: International Business Machines Corporation, Armonk, NY (US)

(72) Inventors: Robert G. Biskeborn, Hollister, CA (US); Robert E. Fontana, Jr., San Jose, CA (US); Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/644,534

(22) Filed: Mar. 11, 2015

(51) Int. Cl.
*G11B 5/23* (2006.01)
*G11B 5/21* (2006.01)
*G11B 5/187* (2006.01)

(52) U.S. Cl.
CPC ............... *G11B 5/23* (2013.01); *G11B 5/1871* (2013.01); *G11B 5/21* (2013.01)

(58) Field of Classification Search
CPC .......... G11B 5/23; G11B 5/232; G11B 5/127; G11B 5/147
USPC ............. 360/119.05, 123.13, 125.41, 125.48, 360/125.02, 125.33, 125.43, 125.5, 125.53, 360/125.54, 125.71, 317, 121
See application file for complete search history.

(56) References Cited

U.S. PATENT DOCUMENTS

| | | | |
|---|---|---|---|
| 4,935,832 A | 6/1990 | Das et al. | |
| 6,288,871 B1 * | 9/2001 | Tanabe | G11B 5/313 360/125.51 |
| 6,890,631 B2 | 5/2005 | Bradshaw | |
| 6,954,340 B2 | 10/2005 | Shukh et al. | |
| 7,467,461 B2 | 12/2008 | Bonhote et al. | |
| 7,573,683 B1 | 8/2009 | Benakli et al. | |
| 8,365,393 B1 | 2/2013 | Benakli et al. | |
| 8,453,317 B2 | 6/2013 | Allen et al. | |
| 2002/0135935 A1 * | 9/2002 | Covington | G11B 5/3109 360/125.41 |
| 2011/0134563 A1 * | 6/2011 | Komagaki | B82Y 10/00 360/75 |
| 2013/0022841 A1 | 1/2013 | Gao et al. | |
| 2015/0071044 A1 * | 3/2015 | Sasaki | G11B 5/6088 369/13.17 |

* cited by examiner

*Primary Examiner* — Allen T Cao
(74) *Attorney, Agent, or Firm* — David B. Woycechowsky

(57) ABSTRACT

A tape write transducer includes a first yoke member, a second yoke member and a shield member arranged in a row so that row includes two gaps: an inter-yoke-member gap (between the two yoke members), and a shield-member gap (between one of the yoke members and the shield member). In operations using an underlayerless tape, the magnetic field in the inter-yoke member gap causes magnetic transitions to be written to the underlayerless recording medium in a point along the tape that is in vicinity to the inter-yoke-member gap. In operations using an underlayer tape, the magnetic field in the shield-member gap causes magnetic transitions to be written to the underlayer tape recording layer at a point along the tape that is in vicinity to the shield-member gap.

20 Claims, 12 Drawing Sheets

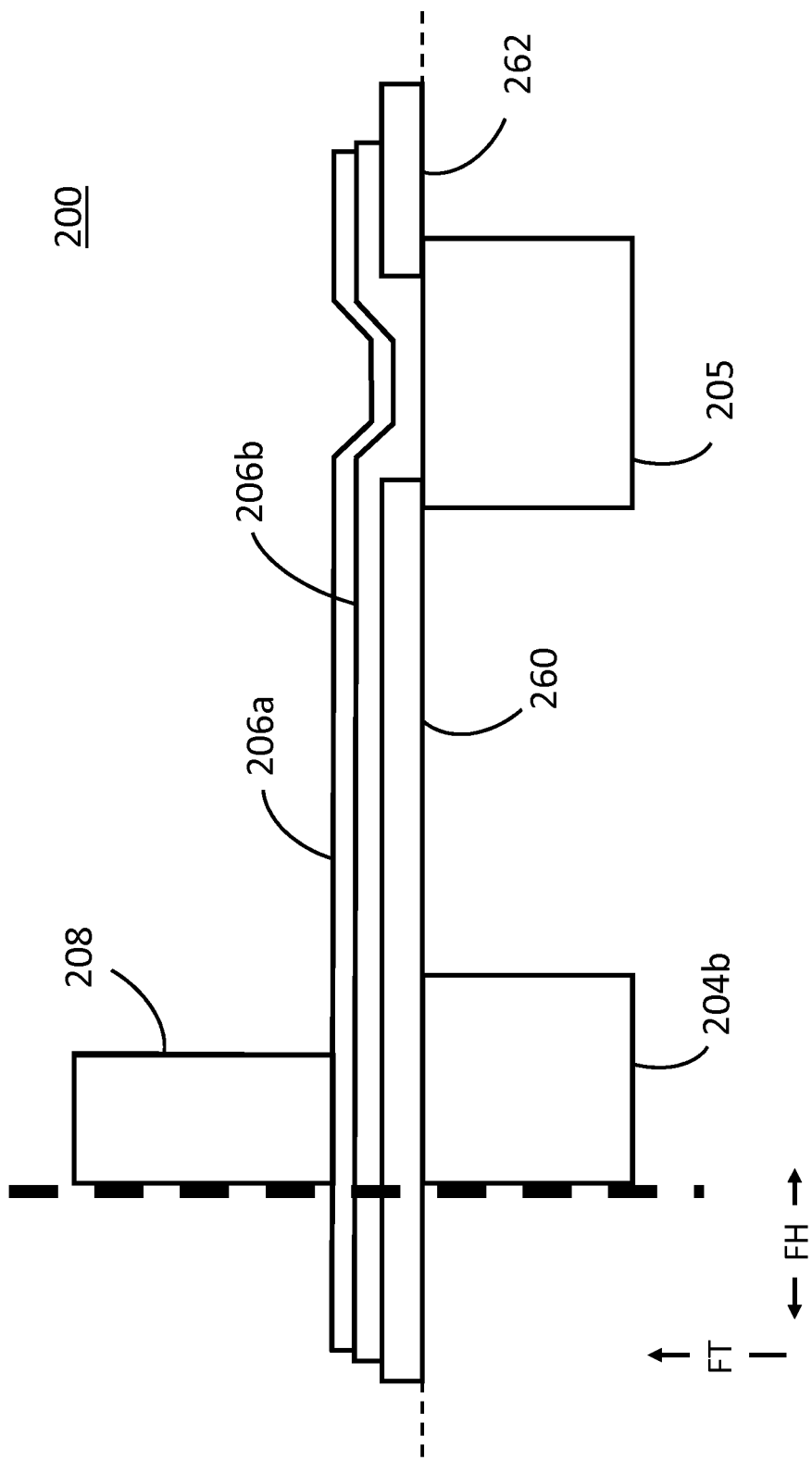

DUAL PURPOSE TAPE WRITE TRANSDUCER

BACKGROUND OF THE INVENTION

The present invention relates generally to the field of write transducers for writing data to magnetic tape, and more particularly to write orientation direction for such write transducers.

In magnetic tape systems, the media: (i) is structured as a long flexible ribbon; (ii) is commonly called "tape;" and (iii) is typically enclosed in tape cartridges that can be mounted and recorded in different tape drives. The cartridge and/or constituent tape are sometimes referred to herein as a "removable medium." Magnetic storage is the storage of data on a magnetized medium. Magnetic storage technology makes use of different patterns of magnetization (specifically, patterns of magnetic transitions) within the body of the tape medium itself, to store data. A transducer (called a "write head") is used to convert portions of an electrical signal to corresponding magnetic transitions on (or, more accurately, "in") the tape storage medium. In order to read the data stored on the tape, the pattern of magnetic transitions located over the length of the tape are later transduced back into an electric signal using a "read head" or a "read/write" head.

Many currently conventional particulate tape media employ an orientation of the magnetic axes (that is, north and south pole directions) of the magnetic material of the tape, relative to the overall geometry of the tape (that is, longitudinal direction, thickness direction, transverse direction), which is called "perpendicularly oriented." More specifically, "perpendicularly oriented" means that the anisotropy axes of the small magnetic particles that compose the medium are oriented: (i) parallel to the thickness direction of the tape; and (ii) perpendicular to planes defined by the major surfaces of the tape medium. As the following is used herein, "non-parallel oriented" is somewhat similar to the term "perpendicularly oriented," but more broadly means that the direction of anisotropic axes of the magnetic material are not substantially parallel to the major surfaces of the tape medium.

In some conventional tape designs, perpendicularly-oriented tape media are made without a magnetic soft underlayer (herein called "underlayerless tape"). Underlayerless tape is typically recorded with a "ring head" in order to ensure reliable magnetization of the perpendicularly-oriented magnetic material.

Another newer conventional tape design includes a soft underlayer which is in a laminate (that is, stacked layer) structure with a thin magnetic recording layer (particulate or thin-film). The soft underlayer: (i) is bound to the recording layer so that it will be adjacent to the major surface of the recording layer which is opposite the major surface of the recording layer which passes directly by the write head during a write operation; (ii) is magnetically soft so that it is temporarily magnetized by the write head as a given portion of the underlayer passes by the write head; and (iii) helps ensure an appropriate magnetic field all the way through the thickness of the recording layer during write operations so that there is reliable and effective writing of perpendicular magnetic transitions in the recording layer.

Conventional write head structures enable recording at relatively large areal densities. For perpendicular oriented tape media with a soft magnetically underlayer, as described in the previous paragraph, the write head structure typically includes a pole head with a trailing shield.

SUMMARY

According to an aspect of the present invention, a write transducer is provided for use with underlayer type magnetic tape storage mediums and underlayerless type magnetic tape mediums. The write transducer includes: a set of electric coil(s); a first yoke member; a second yoke member; and a shield member. The first yoke member, the second yoke member and the shield member are made of magnetizable material(s). The first yoke member, the second yoke member and the shield member are arranged in a row along a tape travel direction and are aligned to form a tape bearing surface. The first yoke member and the second yoke member are sized, shaped and/or located to define an inter-yoke-member gap. The second yoke member and the shield member are sized, shaped and/or located to define a shield-member gap. The first yoke member and the second yoke member are sized, shaped and/or located so that current in the set of electric coil(s) will magnetize the first and second yoke members in opposite magnetic polar orientations. The first yoke member, the second yoke member and the shield member are sized, shaped and/or located so that, in operation: (i) magnetic transitions will be written to underlayerless type magnetic tape mediums in the vicinity of the inter-yoke-member gap but not the shield-gap, and (ii) magnetic transitions will be written to underlayer type magnetic tape mediums in the vicinity of the shield-gap.

According to a further aspect of the present invention, a write transducer is provided for use with underlayer type magnetic tape storage mediums and underlayerless type magnetic tape mediums. The write transducer includes: a set of electric coil(s); a first yoke member including a bottom yoke layer and a front yoke stud member; a second yoke member including a write pole stitch layer and a high moment layer; and a shield member. The first yoke member, the second yoke member and the shield member are made of magnetizable material(s). The first yoke member, the second yoke member and the shield member are arranged in a row along a tape travel direction and are aligned to form a substantially co-planar tape bearing surface. The front yoke stud member of the first yoke member and the write pole stitch layer of the second yoke member are sized, shaped and/or located to define an inter-yoke-member gap. The high moment layer of the second yoke member and the shield member are sized, shaped and/or located to define a shield-member gap. The first yoke member and the second yoke member are sized, shaped and/or located so that current in the set of electric coil(s) will magnetize the first and second yoke members in opposite magnetic polar orientations. The first yoke member, the second yoke member and the shield member are sized, shaped and/or located so that, in operation: (i) magnetic transitions will be written to underlayerless type magnetic tape mediums in the vicinity of the inter-yoke-member gap but not the shield-gap, and (ii) magnetic transitions will be written to underlayer type magnetic tape mediums in the vicinity of the shield-gap.

According to a further aspect of the present invention, there is a method of fabricating a write transducer for use with underlayer type magnetic tape storage mediums and underlayerless type magnetic tape mediums, the write transducer. The method includes the following steps (not necessarily in the following order): (a) providing a bottom yoke layer defining an up direction and a down direction; (b) forming a set of electric coils above the bottom yoke layer by one of the following processes: (i) deposition, or (ii) electroplating; (c) forming a front yoke stud member and a back yoke stud member above the bottom yoke layer by lithography and electroplating; (d) adding an inter-yoke-member gap layer that extends over a top surface of the front yoke stud member; (e) depositing a set of write pole layer(s) over at least a portion of a top surface of the inter-yoke-member gap layer and at least a portion of a top surface of the back yoke stud member, with the deposition of the set of write pole layer(s) defining an inter-yoke-member gap between the top surface of the front yoke stud member and a bottom surface of the set of write pole layer(s); (f) adding a shield-member gap layer that extends over a top surface of the set of write pole layer(s); and (g) depositing a shield over at least a portion of a top surface of the shield-member gap layer, with the deposition of the shield-member defining a shield-member gap between the top surface of the set of write pole layer(s) and a bottom surface of the shield member.

BRIEF DESCRIPTION OF THE DRAWINGS

FIG. 12 is a cross-sectional view (cross-hatching omitted for clarity of illustration purposes) of a portion of the second embodiment write transducer as it is being fabricated.

DETAILED DESCRIPTION

Some embodiments of the present invention are directed to a tape write head (also called "tape write transducer") with a first yoke member, a second yoke member and a shield member arranged in a row so that the row includes two gaps: an inter-yoke-member gap (between the two yoke members), and a shield-member gap (between one of the yoke members and the shield member). In operations using an underlayerless tape: (i) the two yoke members are magnetized by a current-carrying coil, with the magnetic orientations of the two yoke members being determined by the direction of the electrical signal in the current-carrying coil; (ii) the magnetization of the yoke members causes a magnetic field in the inter-yoke-member gap; and (iii) the magnetic field in the inter-yoke member gap causes magnetic transitions to be written to the underlayerless recording medium in a point along the tape that is in vicinity to the inter-yoke-member gap. In operation using an underlayer tape: (i) the two yoke members are magnetized by a current-carrying coil, with the magnetic orientations of the two yoke members being determined by the direction of the electrical signal in the current-carrying coil; (ii) the underlayer of the tape causes a magnetic field to exist in the shield-member gap (despite the fact that the shield member is not magnetized by the coil); and (iii) the magnetic field in the shield-member gap causes magnetic transitions to be written to the underlayer tape recording layer at a point along the tape that is in vicinity to the shield-member gap.

In some embodiments of the present invention, the magnetic fields generated by the transducer are suitable for writing on (underlayer and/or underlayerless) tape, with perpendicular orientation magnetic transitions. In some embodiments, the transducer structure uses two gaps (spaced apart in the direction of elongation of the tape medium) for respectively writing underlayer tape or underlayerless tape. This dual purpose tape write transducer has the capability to work with new generation media (specifically, soft underlayer tape) and old generation media (specifically, tape with no underlayer, originally designed for ring heads), thereby preserving backward compatibility with respect to tape products usable by some embodiments of the tape write head. Some embodiments of the present invention provide a tape system with a recording head including hardware designed to: (i) allow the use of tape media with a magnetically soft underlayer (typically newer tape designs), or without a magnetically soft underlayer (typically older tape designs).

Figure 1:
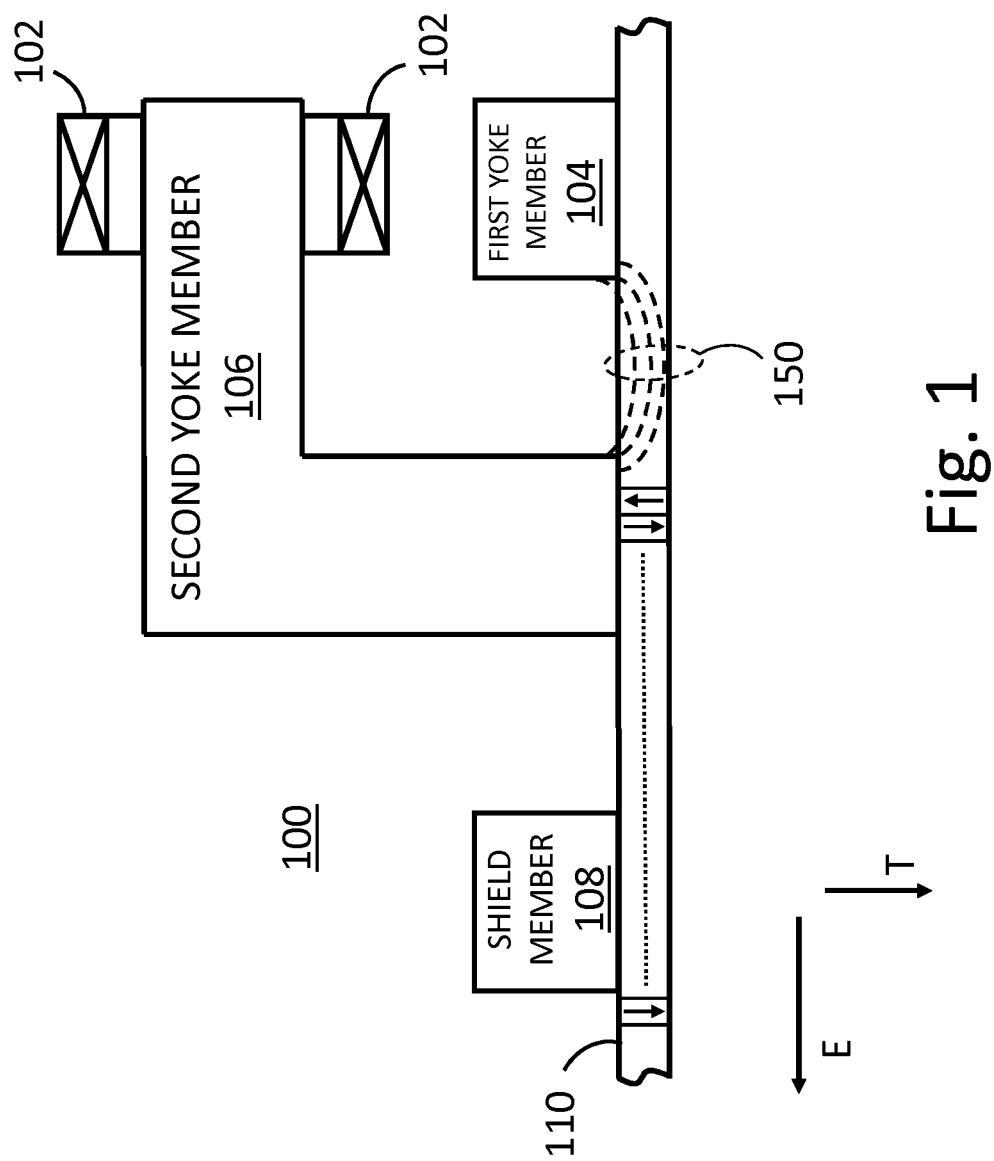
FIG. 1 is a cross-sectional view (cross-hatching omitted for clarity of illustration purposes) of a first embodiment of a write transducer according to the present invention.
Figure 2:
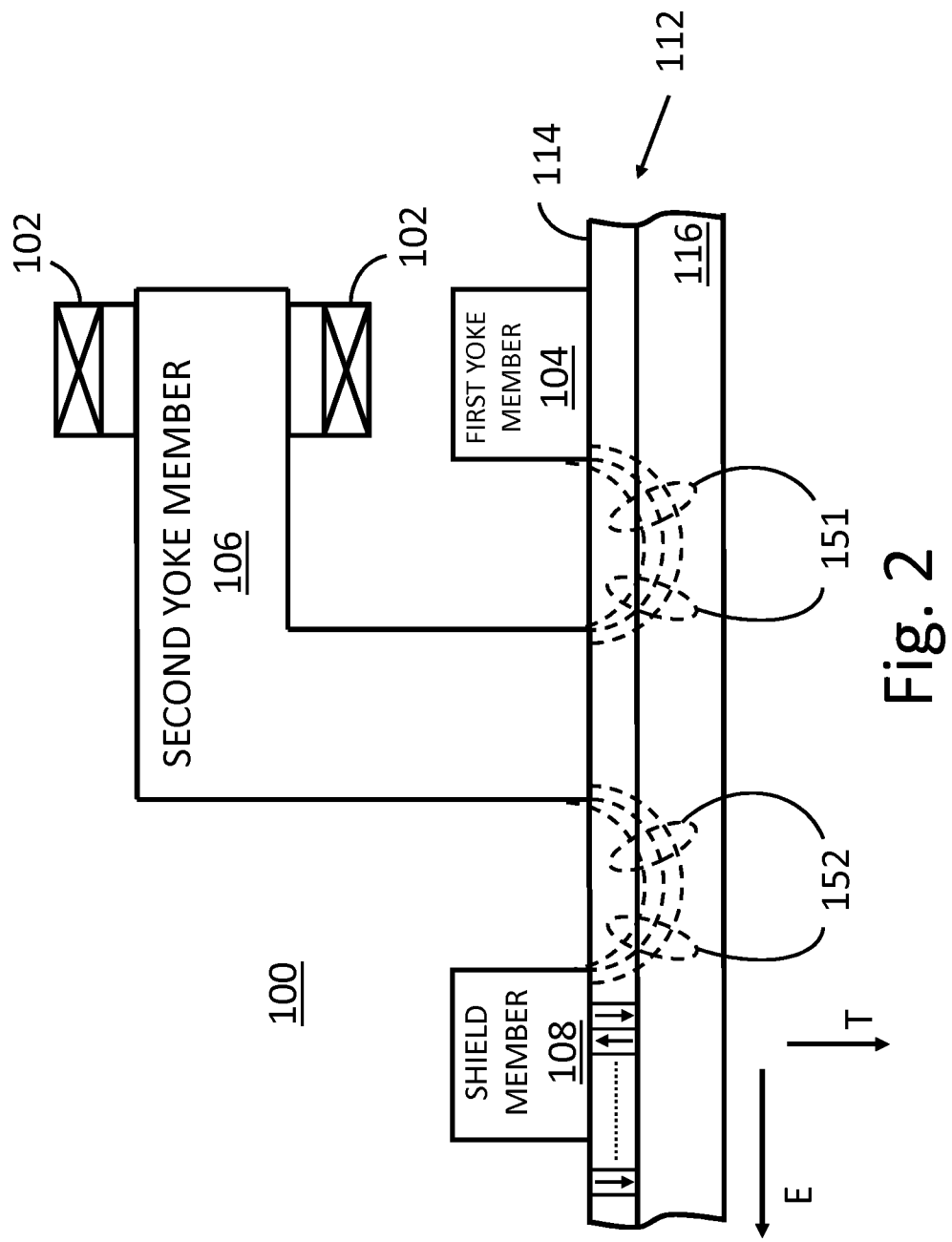
FIG. 2 is another cross-sectional view (cross-hatching omitted for clarity of illustration purposes) of the first embodiment write transducer.

As shown in FIGS. 1 and 2, tape write transducer 100 includes: electrical coil 102; first yoke member 104; second yoke member 106; and shield member 108. In FIG. 1, tape write transducer is being used to write data on underlayerless tape medium 110 (which travels in tape travel direction E and has a thickness in direction T). In FIG. 2, tape write transducer is being used to write data on underlayer tape medium 112 (which travels in tape travel direction E and has a thickness in direction T). Tape medium 112 includes: recording layer 114; and magnetically soft underlayer 116.

It should be understood that FIGS. 1 and 2 are not drawn to scale, for clarity of illustration purposes. Also, the dotted lines indicating magnetic fields are not necessarily accurate or precise, but rather are merely intended to convey a general understanding of some embodiments of the present invention. Importantly, the gap widths have been greatly exaggerated for clarity of illustration reason, which may make it appear that embodiment 100 is designed to write to parallel-orientation tape medium, rather than perpendicular-orientation tape medium. However, regardless of the distortions introduced by the lack of scale in FIGS. 1 and 2, it should be kept in mind that transducer 100 writes perpendicular transitions to perpendicular-orientation tape mediums.

As shown in FIG. 1, in operation with underlayerless tape medium 110, current flows in coil 102 in a direction that changes according to the electrical signal being transduced (that is, the signal that represents the data to be stored on underlayerless tape medium 110). In this embodiment, the electrical signal is time multiplexed to convey a digital one or digital zero, each within a controlled window of time. This current flow in coil 102 causes first yoke member 104 and second yoke member 106 to become magnetized in a relative north-south pole orientation according to the current flow direction (and ultimately according to the digital data to be saved). This magnetization of the yoke members causes the magnetic field shown by dotted lines in FIG. 1. Over time, as the orientation of the magnetic field changes in a controlled manner, magnetic transitions are written to underlayerless tape medium 110 at a small zone (sometimes called a "point") 150 in the vicinity of the gap between the first yoke member and the second yoke member (sometimes referred to as an inter-yoke-member gap.

After any transitions are written at point 150: (i) underlayerless tape medium 110 travels in tape travel direction E; (ii) a new portion of underlayerless tape medium 110 will be in the vicinity of the inter-yoke-member gap; and (iii) a new magnetic transition is written (as appropriate according to the data being stored) at the new portion of underlayerless tape medium 110. This process repeats over and over along the whole length of the tape so that a great deal of data can be erasably stored within the relatively compact space of a tape cartridge.

As shown in FIG. 2, in operation with underlayer tape medium 112, current flows in coil 102 in a direction that changes according to the electrical signal being transduced (that is, the signal that represents the data to be stored on underlayer tape medium 112). In this embodiment, the electrical signal is time multiplexed to convey a digital one or digital zero, each within a controlled window of time. This current flow in coil 102 causes first yoke member 104 and second yoke member 106 to become magnetized, similar to the magnetization discussed in connection with FIG. 1. Also similar to FIG. 1, in FIG. 2, this magnetization of the yoke members causes a magnetic field in the inter-yoke-member gap (see tape portion 151 in FIG. 2). However, and more importantly with respect to operations using underlayer tape medium 112, underlayer 116 acts as a sort of "pole piece", such that a magnetic field is also generated in the gap between second yoke member 106 and shield member 108 (sometimes herein called the "shield-member gap") at tape portion 152. Accordingly, magnetic transitions will be written to recording layer 114 at tape portion 152 in the vicinity of the shield member gap.

Over time, as the orientation of the magnetic field changes in a controlled manner, magnetic transitions are written to underlayer tape medium 112 at point 151 (in the vicinity of the inter-yoke-member gap) and also at point 152. However, because the tape travel direction is E (that is, from the inter-yoke-member gap going towards the shield member gap): (i) the magnetic transitions written in the vicinity of the inter-yoke-member gap are subject to being rewritten when that point in the tape reaches the shield-member gap; and (ii) the magnetic transitions written by the shield member gap will remain as stored data when the tape is spooled onto the take-up spool in its tape cartridge.

In this embodiment 100, the lower surfaces of the yoke members and the shield member are substantially co-planar, but this is not necessarily required in all embodiments of the present invention.

Figure 3:
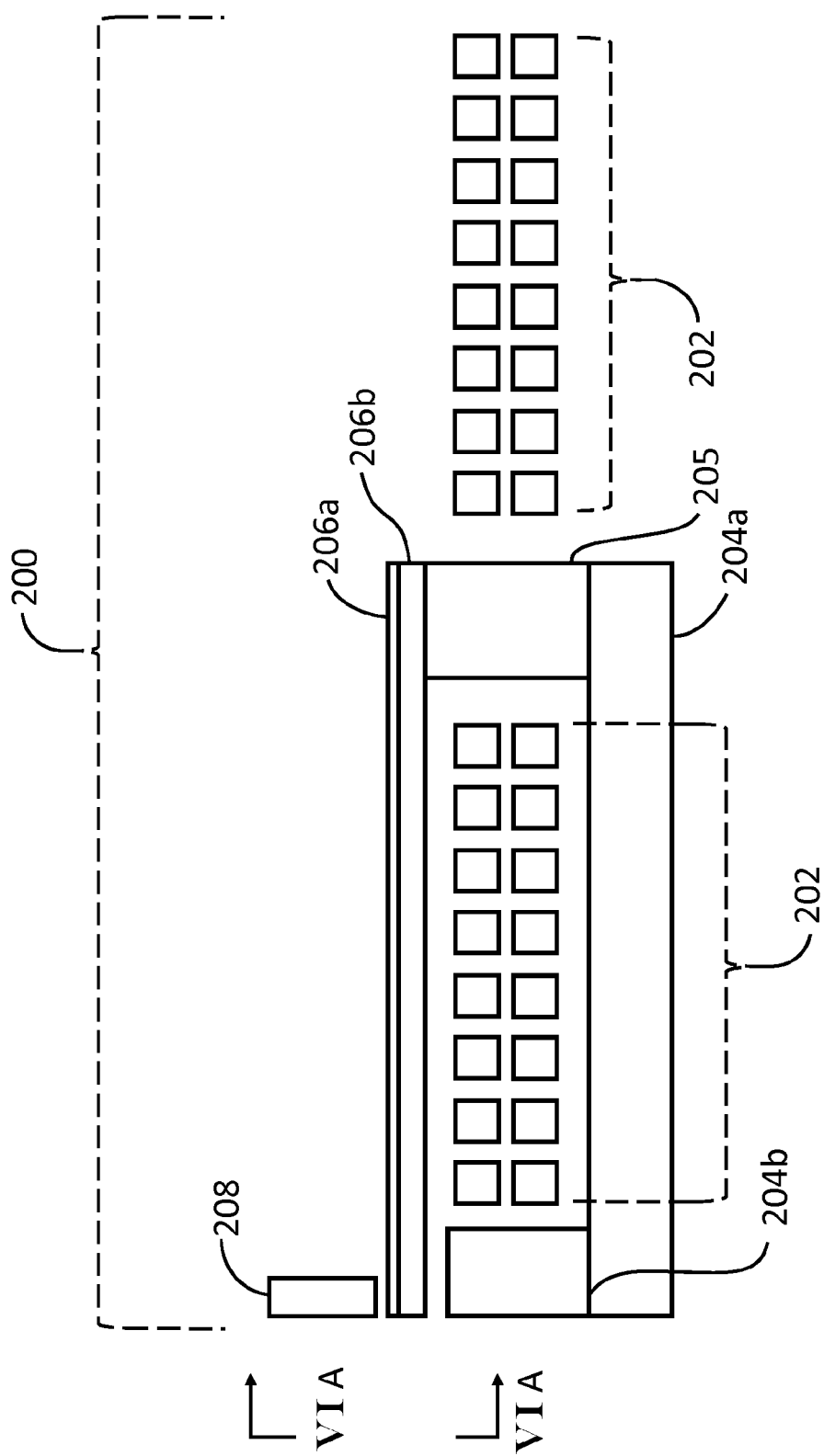
FIG. 3 is a cross-sectional view (cross-hatching omitted for clarity of illustration purposes) of a second embodiment of a write transducer according to the present invention.
Figure 4:
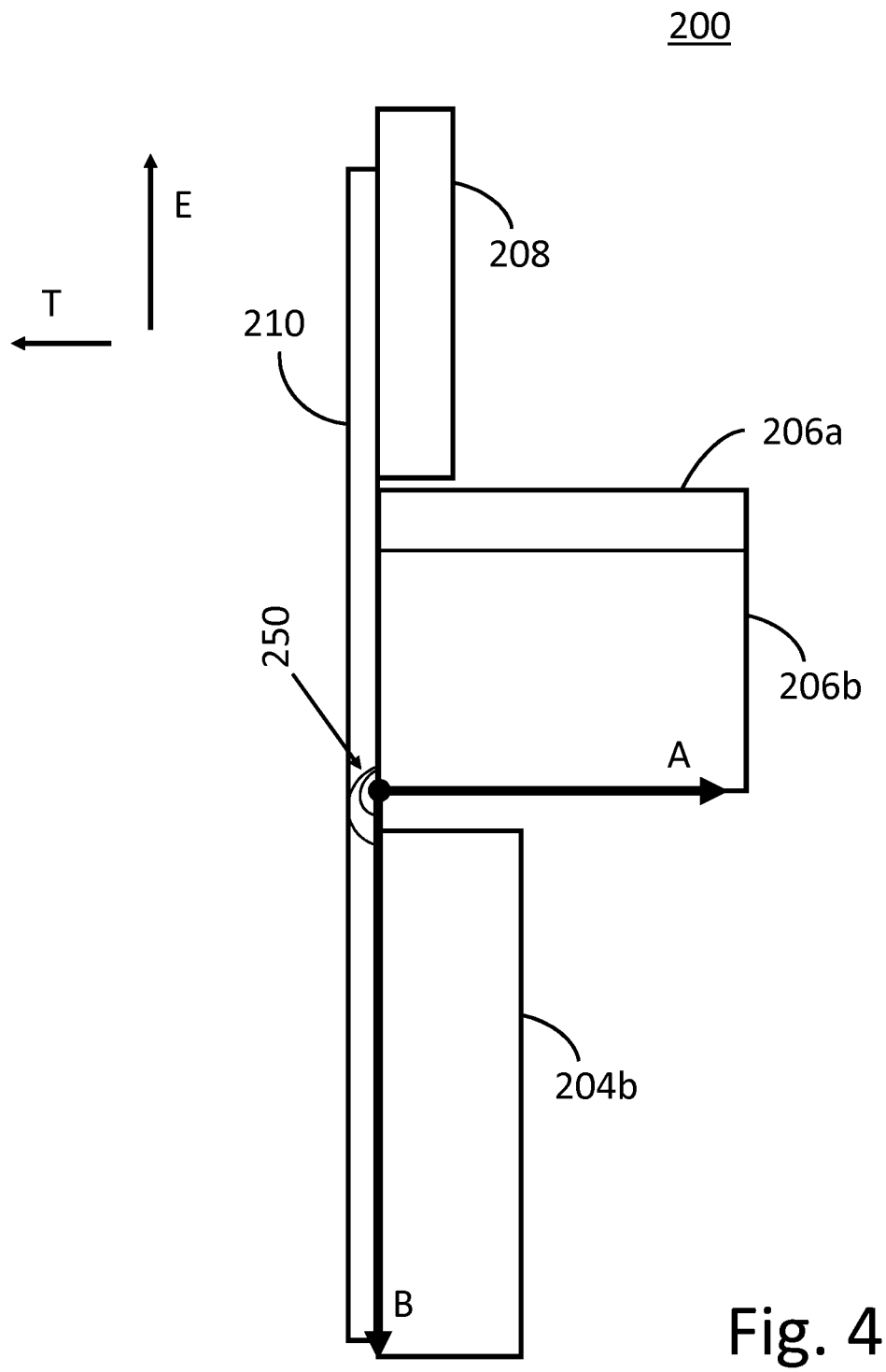
FIG. 4 is another cross-sectional view (cross-hatching omitted for clarity of illustration purposes) of a portion of the second embodiment write transducer.
Figure 5:
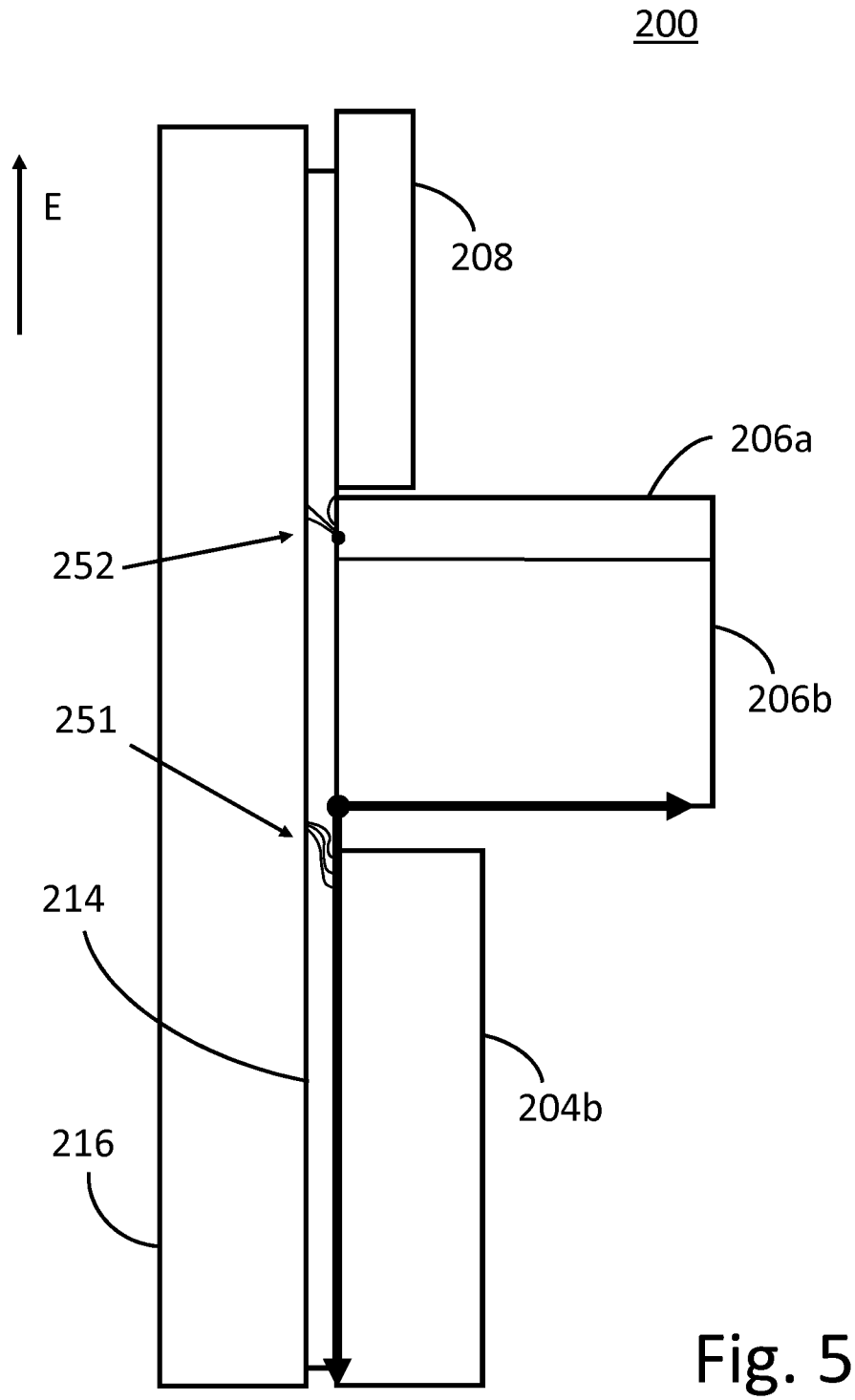
FIG. 5 is a cross-sectional view (cross-hatching omitted for clarity of illustration purposes) of a portion of the second embodiment write transducer.

As shown in FIGS. 3 to 5, tape write transducer 200 includes: electrical coils 202; first yoke member 204 (including bottom yoke layer 204a and front yoke stud 204b); back yoke stud 205; second yoke member 206 (including high moment layer 206a and write pole stitch layer 206 b); and floating shield member 208.

As shown in FIG. 3, electrical coils 202 are wound about a central axis defined by back yoke stud 205. Depending upon the direction of current flow in electrical coils: (i) the current flowing in the coils will induce first yoke member to act as a north magnetic pole and the second yoke member to act as a south magnetic pole; or (ii) the current flowing in the coils will induce first yoke member to act as a south magnetic pole and the second yoke member to act as a north magnetic pole. Yoke members 204, 206 and back yoke stud 205 are magnetically soft in order to allow this magnetization to take place, and to take place in a relatively energy efficient manner. This is how tape write transducer 200 transduces an electrical data write signal into a magnetic data write signal.

As shown in FIG. 4, tape write transducer 200 is being used to write data on underlayerless tape medium 210 (which travels in tape travel direction E and has a tape thickness in direction T (also called the "perpendicular direction")). As shown in FIG. 5, tape write transducer 200 is being used to write data on underlayer tape medium 214, 216 (including recording layer 214 and magnetically soft underlayer 216).

The design of transducer 200 includes three magnetic components that: (i) form a tape bearing surface (see FIG. 6B at dotted line); and (ii) project magnetic fields into the space occupied by the recording layer of the medium (whether underlayer type or underlayerless type). The three magnetic components are: (i) front yoke stud 204b; (ii) second yoke member (also sometimes referred to herein as "write pole") 206; and (iii) floating shield 208. These three magnetic components are arranged in a row along the direction E of tape travel, and define two gaps as follows: (i) an inter-yoke-member gap (between front yoke stud 204b and write pole 206); and (ii) shield-member gap (between write pole 206 and shield member 208). As with transducer 100, discussed above, transduced magnetic field: (i) in the vicinity of the inter-yoke-member gap writes perpendicular-orientation magnetic transitions onto underlayerless type tape mediums; and (ii) in the vicinity of the shield-member gap writes perpendicular-orientation magnetic transitions onto underlayer type tape mediums.

FIG. 4 shows lines indicating relatively high magnetic field concentration in the vicinity of tape point 250. This field strength is further indicated by arrows A and B. Field concentration is relatively high at point 250, because as mentioned above, first yoke member 204 and second yoke member 206 will have opposite magnetic polarities induced by current in the coils. There are no similar lines of high magnetic field concentration in the vicinity of the shield member gap because shield member 208 is not magnetized. This means that, for an underlayerless tape, the magnetic field in the vicinity of the inter-yoke-member gap will overcome the magnetic coercivity of underlayerless tape 210 and write magnetic transitions at that point as given points on the tape travel through that region in direction of tape travel E. These magnetic transitions will remain in the medium, even as it travels by the shield-member gap because there is no strong magnetic field there that could overcome the magnetic coercivity of the tape medium and change the magnetic transitions previously written in the vicinity of the inter-yoke-member gap.

FIG. 4 shows lines indicating relatively high magnetic field concentration in the vicinity of tape point 250. This field strength is further indicated by arrows A and B. Field concentration is relatively high at point 250, because as mentioned above, first yoke member 204 and second yoke member 206 will have opposite magnetic polarities induced by current in the coils. In this embodiment, point 250, having the largest magnetic field concentration occurs, more specifically, at the rearmost portion, with respect to tape travel direction E, of second yoke member 206 (that is, the "leading region" of the inter-yoke-member gap). There are no similar lines of high magnetic field concentration in the vicinity of the shield member gap because shield member 208 is not magnetized. This means that, for an underlayerless tape, the magnetic field in the vicinity of the inter-yoke-member gap will overcome the magnetic coercivity of underlayerless tape 210 and write magnetic transitions at that point as given points on the tape travel through that region of tape travel E.

These magnetic transitions will remain in the medium, even as it travels by the shield-member gap because there is no strong magnetic field there that could overcome the magnetic coercivity of the tape medium and change the magnetic transitions previously written in the vicinity of the inter-yoke-member gap.

For recording on perpendicular media with a soft magnetic underlayer, the write process is concentrated in the trailing region of shield-member gap, as shown at reference numeral 252 of FIG. 5. This region of high field concentration exists when using underlayer type medium 214, 216 because, as explained above in connection with transducer 100, the magnetically soft underlayer acts as a sort of pole piece which causes a magnetic field in the vicinity of the shield-member gap. To the extent that there may be a zone of high concentration in the vicinity of the inter-yoke-member gap (see reference numeral 251) such that the magnetic coercivity of recording layer 214 is overcome in the vicinity of the inter-yoke member gap, any magnetic transitions caused thereby are subject to being rewritten at tape point 252 as a given point on the tape moves from the vicinity of the inter-yoke-member gap to the vicinity of the shield-member gap. In this way, for media with a soft underlayer, the field concentration is under write pole 206 and terminates at the floating shield gap so that data written to recording layer 214 at tape point 252 will remain on the tape as it continues to travel in tape travel direction E.

A method of making transducer 200 will now be discussed with reference to FIGS. 6A to 12. Because this method involves photolithography and patterning (either subtractive processing like ion milling or additive processing like electroplating), the dimension previously discussed as tape travel direction E will now be as the "fabrication-thickness" dimension FT because it is the thickness direction for laminate layers that will be discussed in connection with the fabrication method of FIGS. 7 to 12. Similarly, the thickness direction T will now be described as the "fabrication-height" dimension FH on a going-forward basis in the discussion of the fabrication method.

Fabrication-thickness (FT) dimensions are determined either by depositions or electroplating. Fabrication-height (FH) dimensions are determined by a process using lithography to determine the location of the back edge of the structure and then lapping to define the final fabrication-height dimension. Fabrication-height is the least controlled of the dimensions.

Figure 6A:
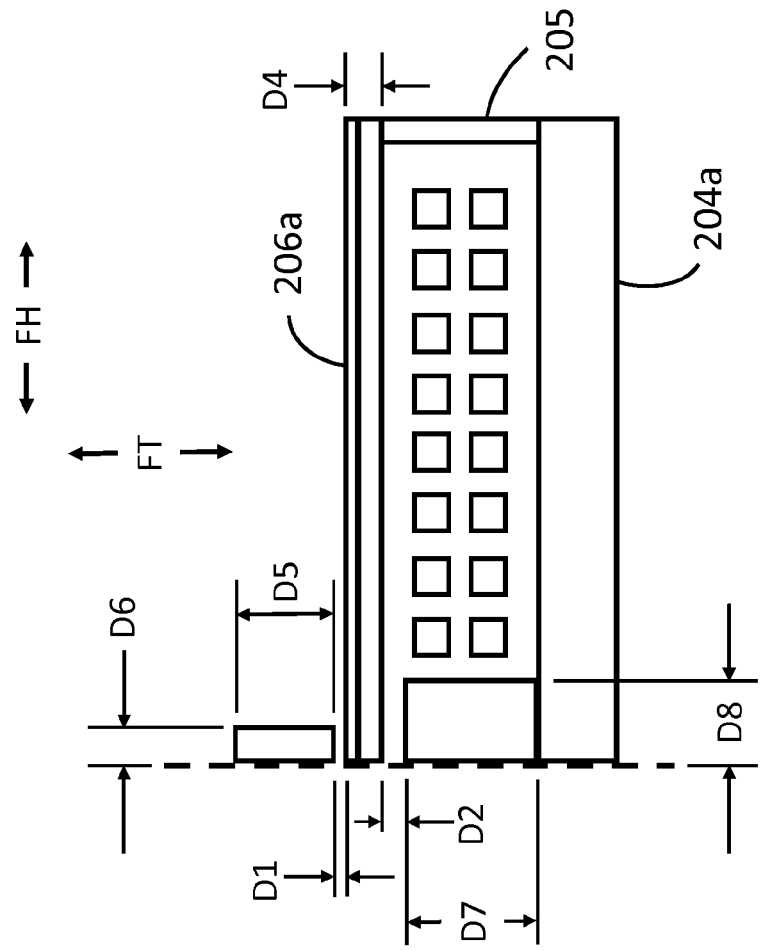
FIG. 6A is a cross-sectional view (cross-hatching omitted for clarity of illustration purposes) of a portion of the second embodiment write transducer.
Figure 6B:
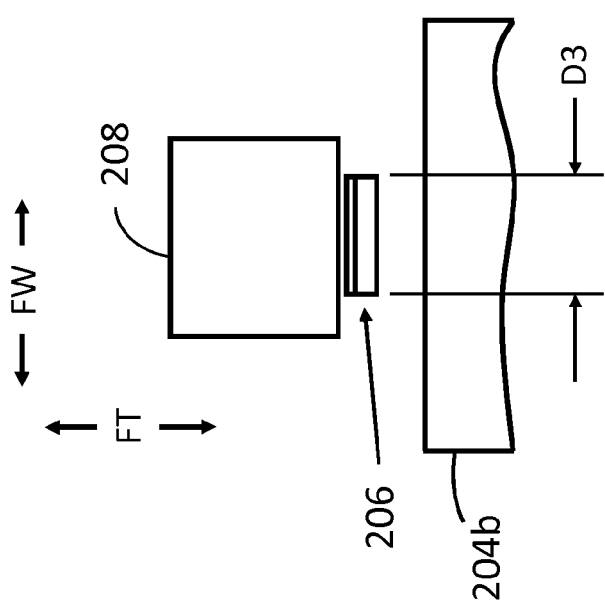
FIG. 6B is a cross-sectional view (cross-hatching omitted for clarity of illustration purposes) of the second embodiment write transducer.

Some example dimensions, D1 to D8, will now be given with reference to FIGS. 6A and 6B: (i) D1 is the floating shield gap fabrication-thickness which is 30 nm (in a range of 20 nm to 50 nm); (ii) D2 is the front yoke stud gap fabrication-thickness which is 150 nm (in a range of 70 nm to 300 nm); (iii) D3 is write pole fabrication-width (direction FW) which is 1.5 um (in a 0.25 um to 5.0 um range); (iv) D4 is the write pole fabrication-thickness which is 0.5 um (in a range of 0.10 um to 2.0 um); (v) D5 is the floating shield fabrication-thickness, which is greater than 1.0 micrometer; (vi) D6 is the floating shield fabrication-height which is 0.20 micrometers (in a range of 0.05 micrometers to 0.5 micrometers); (vii) D7 is the front yoke stud fabrication thickness which is greater than 3.0 micrometers; and (viii) D8 is the front yoke stud fabrication-height which is 0.40 micrometers (in a range of 0.20 micrometers to 1.0 micrometers). The example dimensions, and dimension ranges, for this particular embodiment are based on a target of a 20 Gbit/in$^2$ (gigabit per inch squared) density point and also a range. Note that fabrication-width dimensions are only relevant for write pole 206. Note that fabrication-height dimensions apply only to front yoke stud 204b and the shield member 208.

Materials for floating shield member 208 will now be discussed. In some embodiments, the floating shield is made of $Ni_xFe_y$, with x<45% and y>55% and with x+y=100%. Two suitable forms of $Ni_xFe_y$ are: (i) x=45, y=55; and (ii) x=28, y=72. Suitable materials for floating shield member 208 include high moment NiFe with Ni concentration ≤45% and Fe concentration ≥55% or CoFe, both usually electroplated, or CoZr alloys. Materials for write pole 206 are sputter or ion beam deposited using a variety of NiFe or NiFeCo or CoFe compositions or CoZr or CoPt alloys or iron nitride (chemical formula: Fe(N)). Write pole 206 material may also consist of laminate structures of NiFe, NiFeCo, CoFe, CoZr, CoPt or Fe(N) with non-magnetic materials like for example Ta, SiN3, SiO2, Al2O3.

Figure 7:
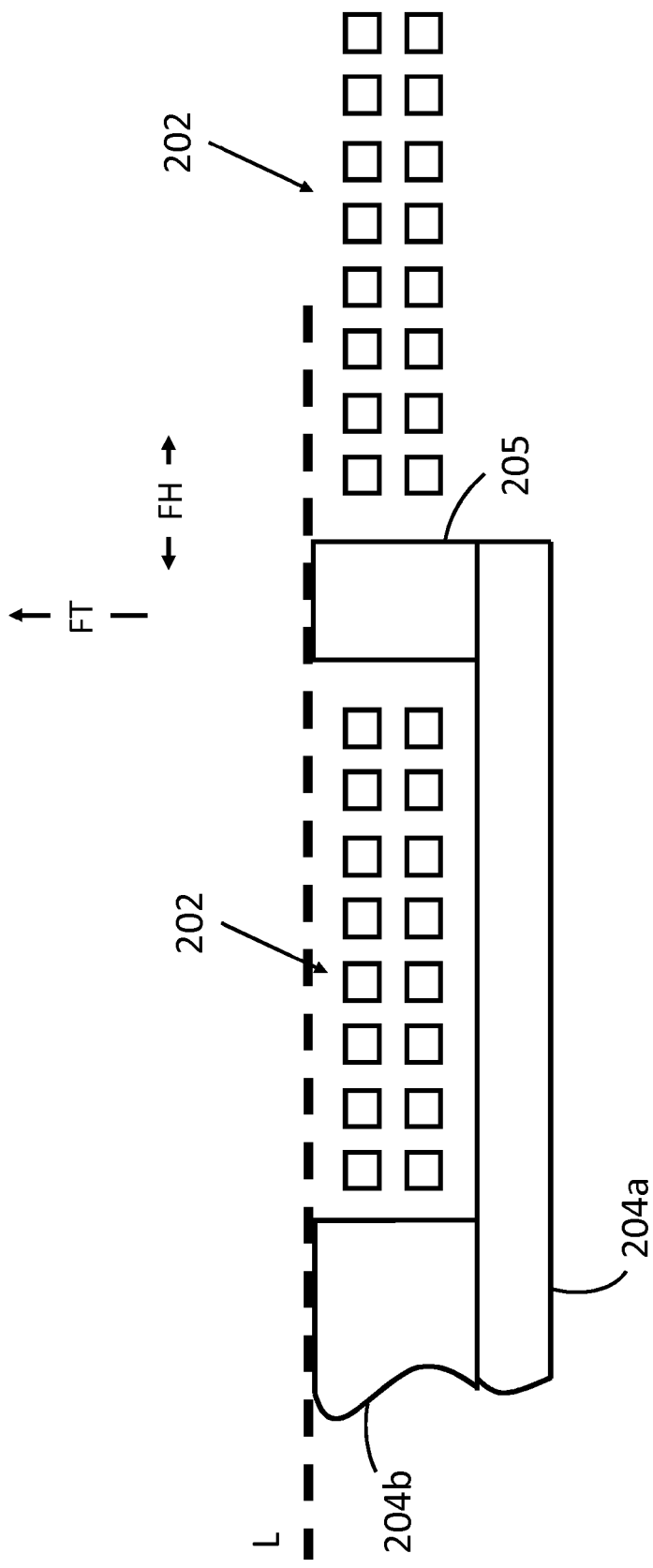
FIG. 7 is a cross-sectional view (cross-hatching omitted for clarity of illustration purposes) of a portion of the second embodiment write transducer as it is being fabricated.

An example fabrication process will now be discussed with reference to FIGS. 7 to 12. Device processing of the two critical gaps in the structure are as follows. First, as shown in FIG. 7, the head structure is built up to the level of coils 202 and then the electroplating of back yoke stud 205 and front yoke stud 204b. The surface is then CMP'd (that is, chemical-mechanical-planarized) to form a planar surface (dotted line L in FIG. 7). The back and front yoke studs 204b, 205 are formed with one lithography step and one electroplating step. This part of the fabrication process structure is shown in FIG. 7, which shows initial processing for the dual purpose write head.

Figure 8:
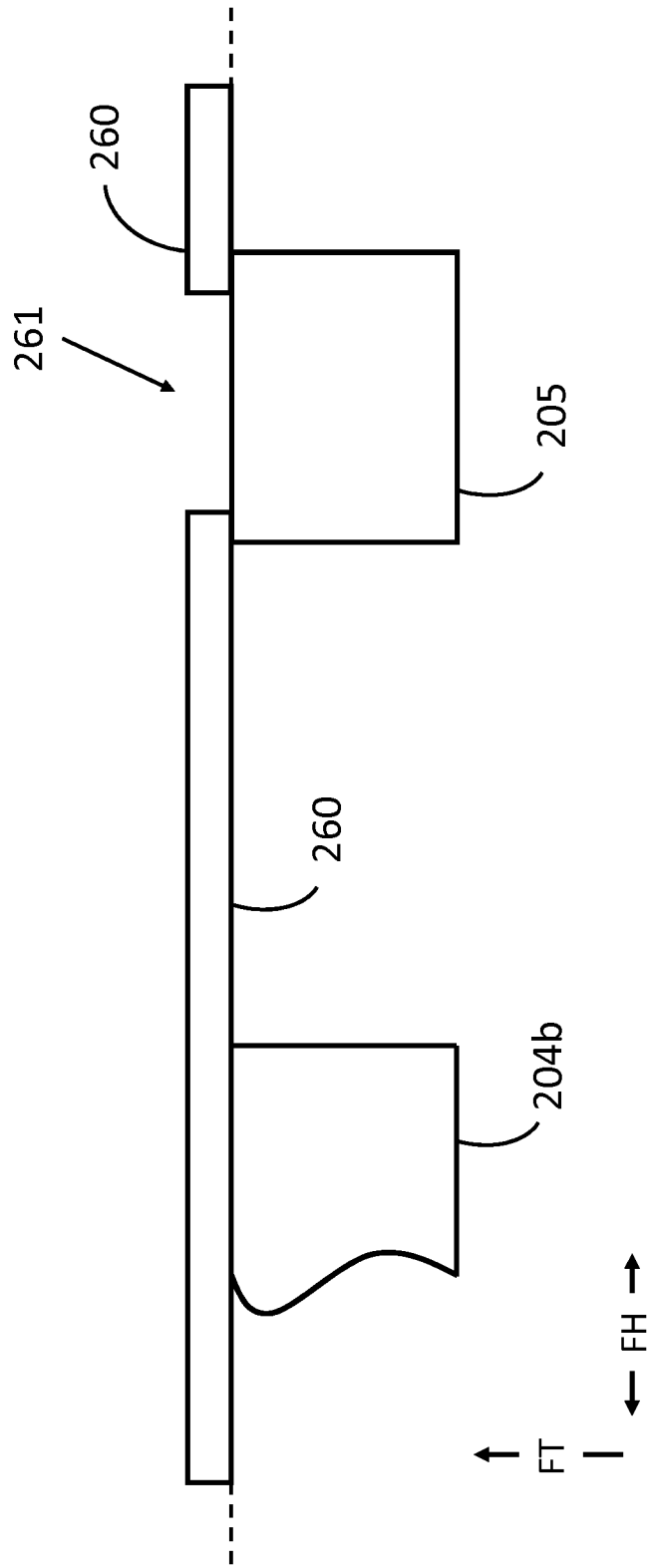
FIG. 8 is a cross-sectional view (cross-hatching omitted for clarity of illustration purposes) of a portion of the second embodiment write transducer as it is being fabricated.
Figure 9:
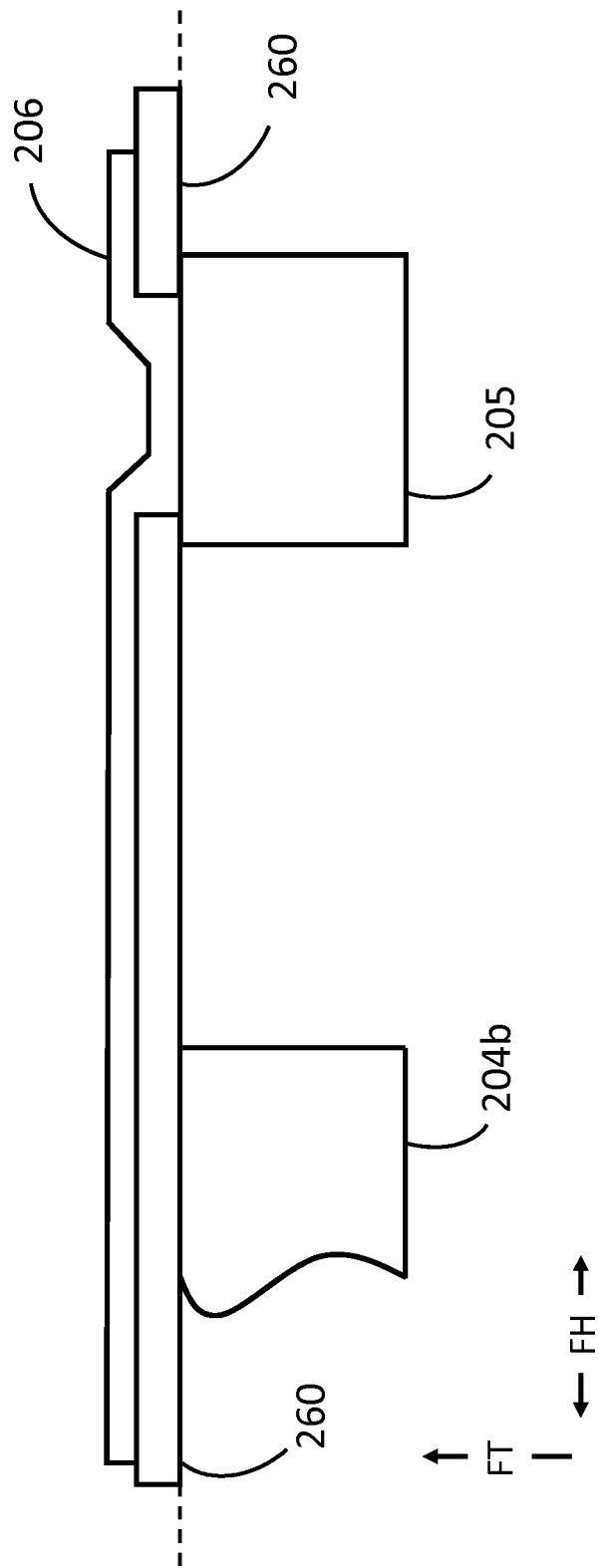
FIG. 9 is a cross-sectional view (cross-hatching omitted for clarity of illustration purposes) of a portion of the second embodiment write transducer as it is being fabricated.
Figure 10:
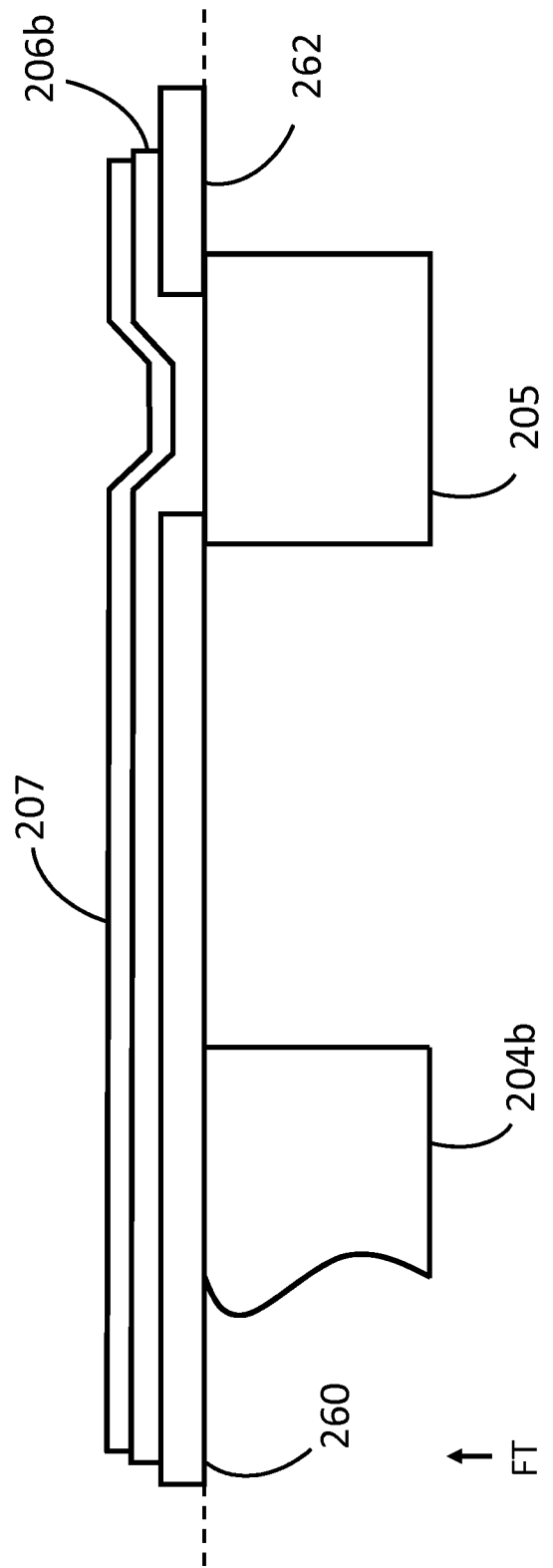
FIG. 10 is a cross-sectional view (cross-hatching omitted for clarity of illustration purposes) of a portion of the second embodiment write transducer as it is being fabricated.

Sequential processing follows as shown in FIGS. 8 to 10. First, as shown in FIG. 8, front yoke stud gap layer 260 gap is deposited and via 261 is opened onto the top surface of back yoke stud 205. Front yoke stud gap layer 260 is made of substantially non-magnetizable material so that it magnetically insulates the first and second yoke members in the vicinity of the inter-yoke-member gap.

As shown in FIG. 9, this is followed by a deposition of write pole 206 material(s) and then patterning to set the fabrication-height (FH) dimension of write pole 206.

Finally, as shown in FIG. 10, shield-member gap layer 207 is deposited. Shield-member gap layer 207 is made of substantially non-magnetizable material so that (in the final transducer device) it magnetically insulates the second yoke member and the shield member in the vicinity of the shield-member gap. This strategy of using gap layers 260, 207 of non-magnetizable material allows both gaps to be formed by full film depositions so that fabrication-thickness (that is, tape travel direction length E) is determined by precise deposition rates.

Figure 11:
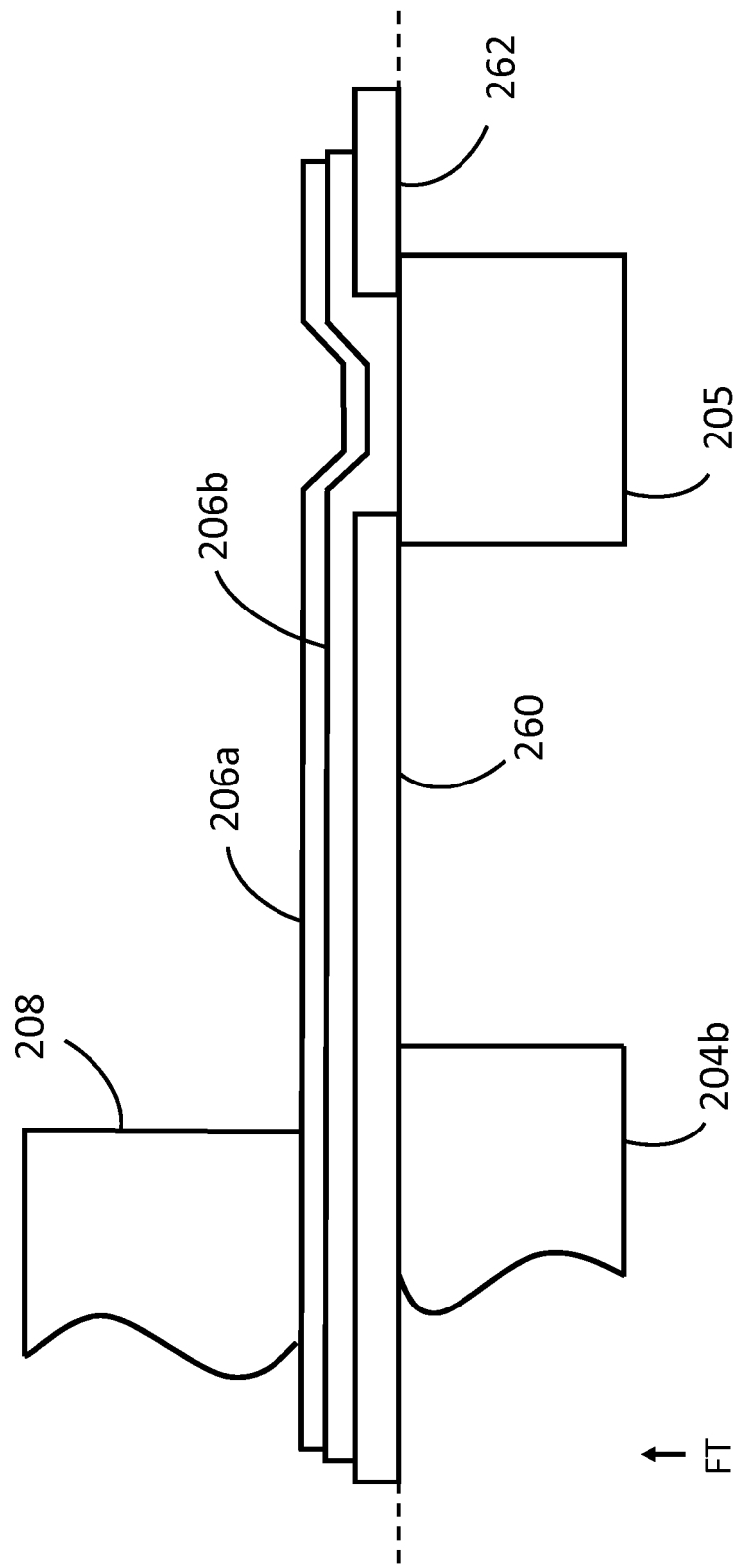
FIG. 11 is a cross-sectional view (cross-hatching omitted for clarity of illustration purposes) of a portion of the second embodiment write transducer as it is being fabricated.

FIGS. 11 and 12 show the processing that forms the fabrication-width (dimension FW) of shield member 208. This part of the fabrication process is conventionally used to form floating shields of HDD (hard disk drive) heads. First, the floating shield shape is electroplated after precise lithography aligns the back edge of shield member 208 (that is, its top surface in the FH direction) structure to a relatively precise reference plane. After plating, shield member 208 is over-coated.

As shown in FIG. 12, during row processing of the device, the tape bearing surface of transducer 200 is lapped to a precise plane with respect to the FH direction, in order to set the final FH dimensions of both floating shield member 208 and the front yoke stud 204b.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

What is claimed is:

1. A write transducer for use with underlayer type magnetic tape storage mediums and underlayerless type magnetic tape mediums, the write transducer comprising:
   a set of electric coil(s);
   a first yoke member;
   a second yoke member; and
   a shield member;
   wherein:
   the first yoke member, the second yoke member and the shield member are made of magnetizable material(s);
   the first yoke member, the second yoke member and the shield member are arranged in a row along a tape travel direction and are aligned to form a tape bearing surface;
   the first yoke member and the second yoke member are sized, shaped and/or located to define an inter-yoke-member gap;
   the second yoke member and the shield member are sized, shaped and/or located to define a shield-member gap;
   the first yoke member and the second yoke member are sized, shaped and/or located so that current in the set of electric coil(s) will magnetize the first and second yoke members in opposite magnetic polar orientations; and
   the first yoke member, the second yoke member and the shield member are sized, shaped and/or located so that, in operation: (i) magnetic transitions will be written to underlayerless type magnetic tape mediums in the vicinity of the inter-yoke-member gap but not the shield-gap, and (ii) magnetic transitions will be written to underlayer type magnetic tape mediums in the vicinity of the shield-gap.

2. The write transducer of claim 1 wherein:
   the first yoke member, the second yoke member and the shield member further are sized, shaped and/or located so that, in operation, magnetic transitions are written in a non-parallel orientation.

3. The write transducer of claim 2 wherein:
   the first yoke member, the second yoke member and the shield member further are sized, shaped and/or located so that, in operation, magnetic transitions are written in a perpendicular orientation.

4. The write transducer of claim 1 wherein:
   the first yoke member, the second yoke member and the shield member further are sized, shaped and/or located so that the inter-yoke-member gap is larger than the shield member gap.

5. The write transducer of claim 1 further comprising:
   a back magnetic yoke stud having a first end and a second end;
   wherein:
   the back magnetic yoke stud is made of magnetizable material;
   the back magnetic yoke stud is located substantially along a central axis of the set of electric coil(s); and
   the back magnetic yoke stud is: (i) mechanically connected to the first yoke member at its first end, and (ii) mechanically connected to the second yoke member at its first end.

6. The write transducer of claim 5 wherein:
   the first yoke member includes a bottom yoke layer and a front yoke stud member; and
   the second yoke member includes a write pole member including a write pole stitch layer and a high moment layer.

7. A write transducer for use with underlayer type magnetic tape storage mediums and underlayerless type magnetic tape mediums, the write transducer comprising:
   a set of electric coil(s);
   a first yoke member including a bottom yoke layer and a front yoke stud member;
   a second yoke member including a write pole stitch layer and a high moment layer; and
   a shield member;
   wherein:
   the first yoke member, the second yoke member and the shield member are made of magnetizable material(s);
   the first yoke member, the second yoke member and the shield member are arranged in a row along a tape travel direction and are aligned to form a substantially co-planar tape bearing surface;
   the front yoke stud member of the first yoke member and the write pole stitch layer of the second yoke member are sized, shaped and/or located to define an inter-yoke-member gap;
   the high moment layer of the second yoke member and the shield member are sized, shaped and/or located to define a shield-member gap;
   the first yoke member and the second yoke member are sized, shaped and/or located so that current in the set of electric coil(s) will magnetize the first and second yoke members in opposite magnetic polar orientations; and
   the first yoke member, the second yoke member and the shield member are sized, shaped and/or located so that, in operation: (i) magnetic transitions will be written to underlayerless type magnetic tape mediums in the vicinity of the inter-yoke-member gap but not the shield-gap, and (ii) magnetic transitions will be written to underlayer type magnetic tape mediums in the vicinity of the shield-gap.

8. The write transducer of claim 7 further comprising:
an inter-yoke-member gap layer; and
a shield-member gap layer;
wherein:
the inter-yoke-member gap layer and the shield-member gap layer are both made of substantially non-magnetizable materials;
the inter-yoke-member gap layer is located in the inter-yoke-member gap between the write pole stitch layer and the front yoke stud member; and
the shield-member gap layer is located in the shield-member gap between the high moment layer and the shield member.

9. The write transducer of claim 7 wherein:
the write transducer is sized, shaped and/or configured to write at 20 gigabits per inch squared.

10. The write transducer of claim 7 wherein:
the shield member is made to include at least one of the following materials: (i) high moment $Ni_xFe_y$, with x being greater than or equal to 45 and y being greater than or equal to 55; (ii) CoFe; and (iii) CoZr.

11. The write transducer of claim 7 wherein the second yoke member includes at least one of the following materials: (i) NiFe, (ii) NiFeCo, (iii) CoZr alloy, (iv) CoFe, (v) CoPt, (vi) Fe(N); (vii) a laminate of NiFe with at least one of the following Ta, $SiN_3$, $SiO_2$ and $Al_2O_3$; (viii) Fe(N) with at least one of the following: Ta, $SiN_3$, $SiO_2$ and $Al_2O_3$; (ix) a laminate of NiFeCo with at least one of the following: Ta, $SiN_3$, $SiO_2$ and $Al_2O_3$; (x) a laminate of CoZr with at least one of the following: Ta, $SiN_3$, $SiO_2$ and $Al_2O_3$; (xi) a laminate of CoFe with at least one of the following: Ta, $SiN_3$, $SiO_2$ and $Al_2O_3$; or (xii) a laminate of CoPt with at least one of the following: Ta, $SiN_3$, $SiO_2$ and $Al_2O_3$.

12. The write transducer of claim 7 wherein:
the first yoke member, the second yoke member and the shield member further are sized, shaped and/or located so that, in operation, magnetic transitions are written in a perpendicular orientation.

13. The write transducer of claim 7 further comprising:
a back magnetic yoke stud having a first end and a second end;
wherein:
the back magnetic yoke stud is made of magnetizable material;
the back magnetic yoke stud is located substantially along a central axis of the set of electric coil(s); and
the back magnetic yoke stud is: (i) mechanically connected to the first yoke member at its first end, and (ii) mechanically connected to the second yoke member at its first end.

14. A method of fabricating a write transducer for use with underlayer type magnetic tape storage mediums and underlayerless type magnetic tape mediums, the write transducer, the method comprising:
providing a bottom yoke layer defining an up direction and a down direction;
forming a set of electric coils above the bottom yoke layer by one of the following processes: (i) deposition, or (ii) electroplating;
forming a front yoke stud member and a back yoke stud member above the bottom yoke layer by lithography and electroplating;
adding an inter-yoke-member gap layer that extends over a top surface of the front yoke stud member;
depositing a set of write pole layer(s) over at least a portion of a top surface of the inter-yoke-member gap layer and at least a portion of a top surface of the back yoke stud member, with the deposition of the set of write pole layer(s) defining an inter-yoke-member gap between the top surface of the front yoke stud member and a bottom surface of the set of write pole layer(s);
adding a shield-member gap layer that extends over a top surface of the set of write pole layer(s); and
depositing a shield over at least a portion of a top surface of the shield-member gap layer, with the deposition of the shield-member defining a shield-member gap between the top surface of the set of write pole layer(s) and a bottom surface of the shield member.

15. The method of claim 14 further comprising:
lapping an edge of the shield member and an edge of the front yoke stud member to create a substantial co-planar tape bearing surface.

16. The method of claim 14 wherein:
the addition of the inter-yoke-member gap layer is performed by full film deposition.

17. The method of claim 14 wherein:
the addition of the shield-member gap layer is performed by full film deposition.

18. The method of claim 17 wherein:
the addition of the inter-yoke-member gap layer is performed by full film deposition; and
the addition of the shield-member gap layer is performed by full film deposition.

19. The method of claim 14 further comprising:
performing chemical-mechanical-planarization on a top surface of the front yoke stud member and the back yoke stud member so that the top surface of the front yoke stud member and a top surface of the back yoke stud member will be at least substantially co-planar prior to deposition of the set of write pole layer(s).

20. The method of claim 14 further comprising:
forming a via in the inter-yoke-member gap layer to expose a top surface of the back yoke stud member.

* * * * *